(12) United States Patent
Reicher (10) Patent No.: US 8,476,875 B2
(45) Date of Patent: Jul. 2, 2013

(54) TV SET TOP BOX WITH AN IMPROVED ABILITY TO SURVIVE A TRANSIENT SIGNAL

(75) Inventor: Eric J. Reicher, Windham, NH (US)

(73) Assignee: Allegro Microsystems, LLC., Worcester, MA (US)

( * ) Notice: Subject to any disclaimer, the term of this patent is extended or adjusted under 35 U.S.C. 154(b) by 338 days.

(21) Appl. No.: 12/902,667

(22) Filed: Oct. 12, 2010

(65) Prior Publication Data

US 2012/0086414 A1 Apr. 12, 2012

(51) Int. Cl.
*G05F 1/10* (2006.01)
(52) U.S. Cl.
USPC ........................................ 323/222; 323/282
(58) Field of Classification Search
USPC .................. 323/207, 211, 222, 225, 282–290, 323/235; 363/16–20, 25, 26, 21.05, 91, 86, 363/21.12; 361/91.3, 91.7, 58
See application file for complete search history.

(56) References Cited

U.S. PATENT DOCUMENTS

| | | | |
|---|---|---|---|
| 4,631,470 A | 12/1986 | Bingley | |
| 5,321,348 A * | 6/1994 | Vinciarelli et al. | 323/222 |
| 5,331,354 A | 7/1994 | Koyama et al. | |
| 5,446,366 A * | 8/1995 | Bassett et al. | 323/222 |
| 5,477,132 A * | 12/1995 | Canter et al. | 323/282 |
| 5,724,235 A | 3/1998 | Shimamori et al. | |
| 6,051,960 A | 4/2000 | Ito et al. | |
| 6,961,252 B2 | 11/2005 | Takada | |
| 7,057,381 B2 * | 6/2006 | Harriman et al. | 323/285 |
| 7,207,054 B1 | 4/2007 | Richards et al. | |
| 7,423,415 B2 * | 9/2008 | Hasegawa et al. | 323/282 |
| 7,495,420 B2 * | 2/2009 | Vinn | 323/266 |

OTHER PUBLICATIONS

Allegro Data Sheet; A8286; "Dual LNB Supply and Control Voltage Regulator;" Jan. 1, 2009; pp. 1-19.
Allegro Data Sheet; A8290; "Single LNB Supply and Control Voltage Regulator;" Jan. 1, 2009; pp. 1-19.
Allegro Data Sheet; A8291; "Single LNB Supply and Control Voltage Regulator:" Jan. 1, 2009; pp. 1-18.
Allegro Data Sheet; A8292; "Dual LNB Supply and Control Voltage Regulator;" Jan. 1, 2009; pp. 1-19.
Allegro Data Sheet; A8293; "Single LNB Supply and Control Voltage Regulator;" Jan. 1, 2009; pp. 1-18.
Intersil Data Sheet; ISL6421A; "Single Output LNB Supply and Control Voltage Regulator With I²C Interface for Advanced Satellite Set-top Box Designs;" FN9167.3; Mar. 9, 2006; pp. 1-12.
Intersil Data Sheet; ISL6423; "Single Output LNB Supply and Control Voltage Regulator With I²C Interface for Advanced Satellite Set-top Box Designs DiSEqC 2.0 Compatible;" FN9191.1; Apr. 10, 2007; pp. 1-16.

(Continued)

*Primary Examiner* — Rajnikant Patel
(74) *Attorney, Agent, or Firm* — Daly, Crowley, Mofford & Durkee, LLP (57) ABSTRACT

A set top box used in a satellite TV system includes a diode coupled in a particular way to better protect an adjustable linear regulator used in the set top box from transient voltages as may result from lighting or the like.

22 Claims, 6 Drawing Sheets

OTHER PUBLICATIONS

Intersil Data Sheet; ISL6425; "Single Output LNB Supply and Control Voltage Regulator With I²C Interface for Advanced Satellite Set-top Box Designs;" FN9176.1; Feb. 8, 2005; pp. 1-12.

Intersil Preliminary Data Sheet; ISL9491, ISL9491A; "Single Output LNB Supply and Control Voltage Regulator With I²C Interface for Advanced Satellite Set-top Box Designs;" FNXXXX.X; Jul. 22, 2008; pp. 1-13.

STMicroelectronics Data Sheet; LNBEH21; "LNB Supply and Control IC With Step-Up Converter and I²C Interface;" Jul. 2004; pp. 1-22.

STMicroelectronics Data Sheet; LNBH23; "LNB Supply and Control IC With Step-Up and I²C Interface;" Apr. 2007; pp. 1-28.

STMicroelectronics Preliminary Data Sheet; LNBH24; "Dual LNB Supply and Control IC With Step-Up and I²C Interface;" Jan. 2007; pp. 1-16.

Intersil; "Single Output LNB Supply Voltage Regulator for Satellite Set-Top Box Applications;" ISL9491, ISL9491A; Oct. 13, 2009; 13 pages.

* cited by examiner

TV SET TOP BOX WITH AN IMPROVED ABILITY TO SURVIVE A TRANSIENT SIGNAL

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to satellite TV set top boxes and, more particularly, to a satellite TV set top box with an improved ability to survive a transient signal.

BACKGROUND OF THE INVENTION

Satellite television systems generally include a low noise block converter (LNB) at a satellite dish for controlling reception of satellite television signals, and a set top box to control the LNB. Functions of the LNB include downconverting received satellite signals, changing the frequency band of signal reception, changing the signal polarization of reception and, in some applications, controlling more than one receive antenna. For these purposes, the LNB requires control signals and power, both of which are provided by circuitry housed in the set top box located near a television set. A user can change the channel of reception via the set top box. Only a single coaxial cable couples the LNB to the set top box, therefore, the control and power signals are carried by the single coaxial cable.

EUTELSAT, a European organization, which governs television satellite communications, establishes specifications for the low noise block converter control and power signals. Analog AC tone control signals are provided by a 22 kHz, 600 mV peak-to-peak, signal which can be used to implement DiSEqC™ (Digital Satellite Equipment Control) encoding for the purpose of changing the polarization and frequency band of received radio frequency (RF) signals. Power to the LNB circuitry itself is provided by whatever DC voltage is being used to transmit digital control information at any given time. The LNB circuitry requires on the order of 0.6 amp of current.

Adjustable linear amplifiers are conventionally used to provide the control and power signals to the LNB. In this arrangement, the linear amplifier provides an AC modulated output voltage, which has an adjustable DC voltage in response to control signals from a microprocessor within the set top box.

An arrangement that uses a switching regulator to power the adjustable linear amplifier is described in U.S. Pat. No. 7,207,054, issued Apr. 17, 2007, which is assigned to the assignee of the present invention, and which is incorporated by reference herein in its entirety.

Various techniques have been used to protect the set top box from transient signals that can be received from the environment in the cable that connects the set top box to the LNB or in the satellite antenna. Such environmental signals can be the result of lightning or static electricity.

Figure 1:
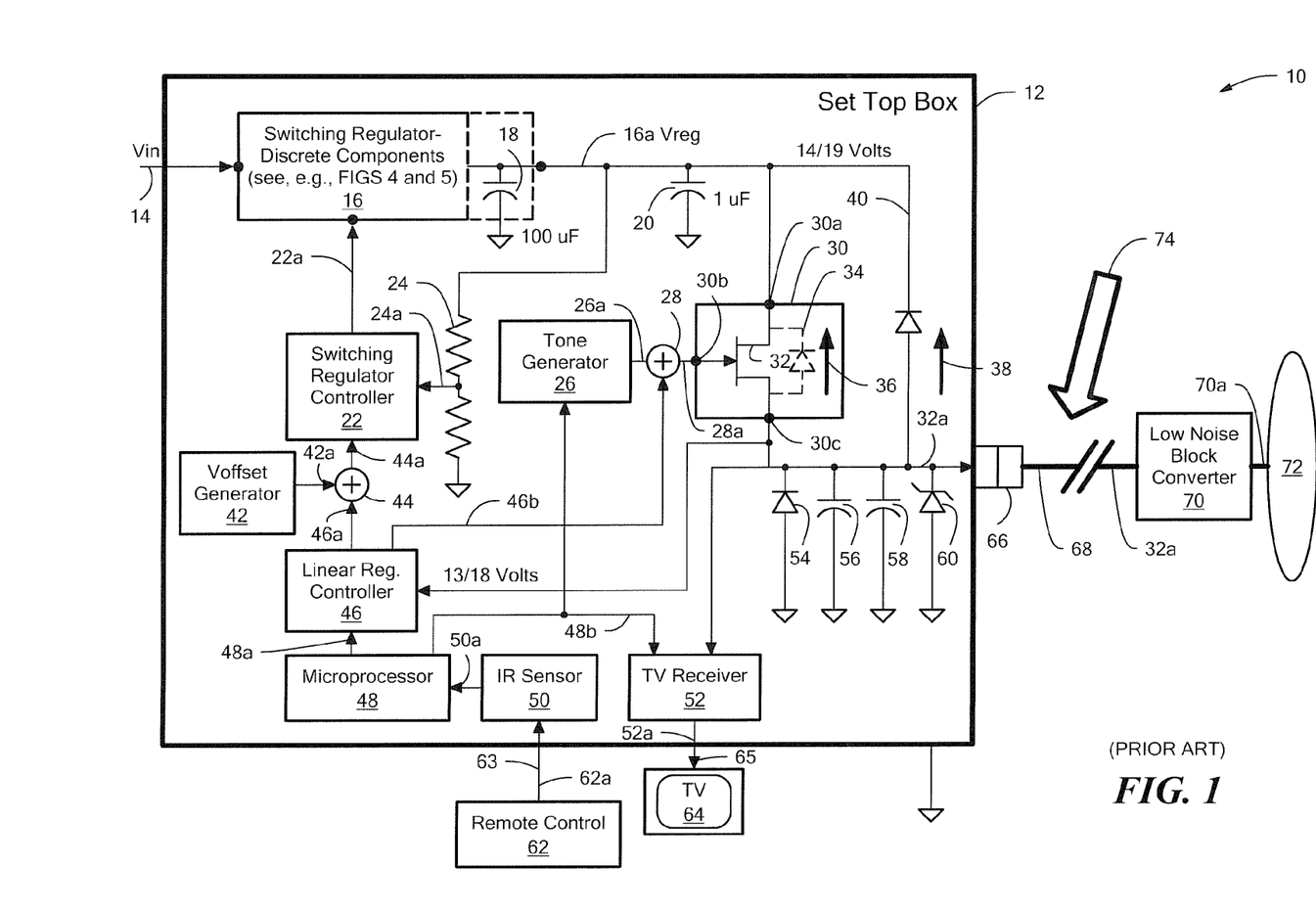

Referring to FIG. 1, a conventional satellite TV system 10 includes a set top box 12 coupled to an LNB 70 though a single coaxial cable 68, coupled to a television set (TV) 64 with a cable 65, and coupled to a remote control 62 with a infrared (IR) link 63.

As described in the above-mentioned U.S. Pat. No. 7,207,054, the set top box 12 can include a switching regulator 16 coupled to receive a DC power input signal 14 and configured to generate a regulated output voltage 16a. The switching regulator 16 can be coupled at its output to a capacitor 18, which can have a large capacitance, for example, about one hundred microfarads. In some embodiments, the capacitor 18 is an electrolytic capacitor. The switching regulator 16 can also be coupled at its output to a capacitor 20, which can have a smaller capacitance, for example, about one microfarad. In some embodiments, the capacitor 20 is a ceramic capacitor. As is known, a ceramic capacitor tends to behave like an ideal capacitor at higher frequencies than an electrolytic capacitor. Thus, the capacitor 16 tend to reduce ripple as may otherwise be generated by the switching regulator 16, and the capacitor 20 tends to reduce higher frequency switching transients as may otherwise be generated by the switching regulator 16.

An adjustable linear voltage regulator 30 is shown here as a field effect transistor (FET) 32 in parallel with a parasitic diode 34. The parasitic diode 34 is not a separate diode, but is a diode inherent to the structure of the FET 32, and is shown in phantom lines accordingly. While the adjustable linear regulator 30 is shown as a FET, it will be understood that an adjustable linear regulator can be designed with a variety of circuit topologies and a variety of circuit components.

The adjustable linear regulator 30 can have an input node 30a coupled to a drain of the FET 32, an output node 30c coupled to a source of the FET 32, and a control node 30b coupled to a gate of the FET 32.

The source of the FET 32 can be coupled to a parallel combination of a diode 54, two capacitors 56, 58, and a zener diode 60, each of which can terminate to ground. In some alternate embodiments, the zener diode is instead a transient voltage suppressor (TVS)

A diode 40, referred to herein as a protection diode, having an anode and a cathode, can be coupled such that the anode is coupled to the source of the FET 32 and the cathode is coupled to the capacitors 18, 20.

The source of the FET 32 is coupled to a connector 66. A signal 32a to and from the set top box 12 is carried by the cable 68. The signal 32a is received by the LNB 70 as a control signal.

The signal 32a also contains television information that travels from the LNB 70 to a TV receiver 52 within the set top box 12. The TV receiver 52 is configured to generate a TV signal 52a carried on the cable 65.

The set top box 12 can also include a voltage divider 24 coupled to receive the regulated output voltage 16a and configured to generate a divided signal 24a. A switching regulator controller 22 can be coupled to receive the divided signal 24a and configured to generate a control signal 22a to control the regulated output voltage 16a of the switching voltage regulator 16. Exemplary switching regulators and control thereof are described more fully below in conjunction with FIGS. 4 and 5.

The set top box 12 can also include an IR sensor 50 coupled via the IR link 63 to receive an IR control signal 62a from the remote control 62 and configured to generate a control signal 50a. A microprocessor 48 can be coupled to receive the control signal 50a and configured to generate a voltage level control signal 48a and a tone control signal 48b.

The set top box 12 can include a linear regulator controller 46 coupled to receive the voltage level control signal 48a and coupled to receive the signal 32a as a feedback signal in a control loop that controls the adjustable linear regulator 30. The linear regulator controller 46 is configured to generate a linear regulator control signal 46b and a corresponding reference signal 46a. The set top box 12 can also include a tone generator 26 coupled to receive the tone control signal 48b and configured to generate a tone signal 26a.

The set top box 12 can also include a summing circuit 44 coupled to receive the reference signal 46a and coupled to receive an offset signal 42a generated by a voltage offset generator 42. The summing circuit 44 is configured to generate a sum signal 44a, which is received by the switching regulator controller 22 as a voltage reference signal to control the regulated voltage output signal 16a.

The set top box can 12 also include another summing circuit 28 coupled to receive a tone signal 26a, coupled to receive the linear regulator control signal 46b, and configured to generate another sum signal 28a. The FET 32 is coupled to receive the sum signal 28a the gate and the adjustable linear regulator 30 is configured to provide a voltage drop controlled by the sum signal 28a.

It should be understood that the set top box 12 includes two voltage control loops. A first control loop is coupled around the adjustable linear regulator 30 (comprised of signals 32a and 46b to and from the linear regulator controller 46). A second control loop is coupled around the switching regulator 16 (comprised of signals 16a and 22a to and from the switching regulator controller 22). The second control loop is influenced by the first control loop via the reference signal 46a. In other words, the switching regulator loop is controlled by the adjustable linear regulator loop to maintain the regulated output voltage 16a a predetermined number of volts (determined by the offset voltage generator 42), for example, one volt, above a DC voltage drop through the adjustable linear regulator 30 (i.e., from node 30a to node 30c).

In operation, the linear regulator controller 46 is controlled by the microprocessor 48 and also by the feedback signal 32a to generate the linear regulator control signal 46b to control the signal 32a to be selected one of about thirteen volts or about eighteen volts. The microprocessor 48 also controls the tone generator 26 to generate the tone signal 26a, for example, a 22 kHz, 600 mV peak-to-peak, tone signal, which can be used to implement DiSEgC™ (Digital Satellite Equipment Control) encoding for the purpose of changing the polarization and frequency band of received RF signals. The sum signal 28a contains both the tone signal 26a and the linear regulator control signal 46b with a selected DC voltage level.

Via the divided signal 24a and via the sum signal 44a (a reference signal), the switching regulator 16 is controlled by the microprocessor 48 to maintain its regulated voltage 16a at a voltage level in accordance with the selected voltage in the reference signal 46a. For example, when the reference signal 46a is about thirteen volts, the regulated output voltage 16a can be about fourteen volts and when the reference signal 46a is about eighteen volts, the regulated output voltage 16a can be about nineteen volts.

As a result of the above, the signal 32a carried on the cable 68 contains a DC level of either about thirteen or about eighteen volts and also a selected tone signal corresponding to the tone signal 26a. The combination of DC level and tone frequency results in commands to the LNB 70 to tune to one of a plurality of TV channel frequencies. In response, the part of the signal 32a that travels from the antenna 72 to the TV receiver 52 contains one TV channel signal.

When subjected to an external undesired signal 74 (also referred to herein as a transient signal), for example, a signal due to lightning or static electricity, which is coupled to the cable 68 by direct, capacitive, or by inductive means, an undesired current 38 (also referred to herein as a transient current signal) flows through the diode 40 and an undesired current 36 (also referred to herein as a transient current signal) flows through the parasitic diode 34. The diode 40 can be a high capacity diode intended to pass the bulk of the overall transient current, discharging the transient current primarily into the large capacitor 18, and less so into the smaller capacitor 20. However, if the transient current 36 has sufficient magnitude, the transient current 36 can cause the FET 32 to fail by damaging the parasitic diode structure 34. It will be understood that, if the transient currents 36, 38 were not allowed to discharge into the capacitor 18, a voltage would be generated on the cable 68 that could destroy other circuits, for example, more of the set top box 12 or the LNB 70.

It would be desirable to provide a different arrangement that can cause the set top box 12 to survive the undesired signal 74 without damage.

SUMMARY OF THE INVENTION

The present invention provides a circuit arrangement in a set top box that can cause the set top box to survive an undesired signal, such as that resulting for lightning or from static electricity.

In accordance with one aspect of the present invention, an electronic circuit includes a switching regulator. The switching regulator includes a switching regulator input node at which an input voltage is received. The switching regulator also includes a voltage holding node. The switching regulator also includes a capacitor coupled at one end to the voltage holding node and coupled at the other end to a reference voltage. The switching regulator also includes a switching regulator control node. The electronic circuit also includes a reverse current blocking circuit comprising first and second nodes. The first node is coupled to the voltage holding node and the second node is coupled to a regulated voltage output node. The reverse current blocking circuit is configured to prevent a current from flowing from the regulated voltage output node into the capacitor. The electronic circuit also includes an adjustable linear regulator. The reverse current blocking circuit is coupled between the switching regulator and the adjustable linear regulator. The electronic circuit also includes a switching regulator controller circuit coupled between the regulated voltage output node and the switching regulator control node. The switching regulator is configured to generate a regulated voltage at the regulated voltage output node.

In some embodiments, the reverse current blocking circuit comprises a reverse current blocking diode having an anode and a cathode, wherein the first node corresponds to the anode and the second node corresponds to the cathode.

In accordance with another aspect of the present invention, an electronic circuit includes a switching regulator. The switching regulator includes a switching regulator input node at which an input voltage is received. The switching regulator also includes a voltage holding node. The switching regulator also includes a capacitor coupled at one end to the voltage holding node and coupled at the other end to a reference voltage. The switching regulator also includes a switching regulator control node. The electronic circuit further includes a reverse current blocking circuit comprising first and second nodes. The first node is coupled to the voltage holding node and the second node is coupled to a regulated voltage output node. The reverse current blocking circuit is configured to prevent a current from flowing from the regulated voltage output node into the capacitor. The electronic circuit further includes an adjustable linear regulator. The reverse current blocking circuit is coupled between the switching regulator and the adjustable linear regulator. The electronic circuit further includes a switching regulator controller circuit coupled between the regulated voltage output node and the switching regulator control node. The switching regulator is configured to generate a regulated voltage at the regulated voltage output node. The electronic circuit further includes a resistor and/or an inductor coupled between the adjustable linear regulator and a circuit output node, wherein a circuit output signal is generated at the circuit output node related to the regulated voltage.

BRIEF DESCRIPTION OF THE DRAWINGS

The foregoing features of the invention, as well as the invention itself may be more fully understood from the following detailed description of the drawings, in which:

FIG. 1 is a block diagram showing a prior art satellite television (TV) system, including a set top box with circuits to protect the set top box when it experiences a transient signal as may be generated by lightning, static electricity, or the like;

FIG. 2 is a block diagram showing another satellite television (TV) system including a set top box with an exemplary circuit arrangement configured to protect the set top box when it experiences a transient signal as may be generated by lightning, static electricity, or the like;

DETAILED DESCRIPTION OF THE INVENTION

Before describing the present invention, some introductory concepts and terminology are explained. As used herein, the term "boost switching regulator" is used to describe a known type of switching regulator that provides an output voltage higher than an input voltage to the boost switching regulator. As used herein, the term "buck switching regulator" is used to describe a known type of switching regulator that provides an output voltage lower than an input voltage to the buck switching regulator. While certain particular circuit topologies of boost and buck switching regulators are shown herein, it should be understood that a buck or a boost switching regulator can be formed in a variety of circuit configurations.

Figure 2:
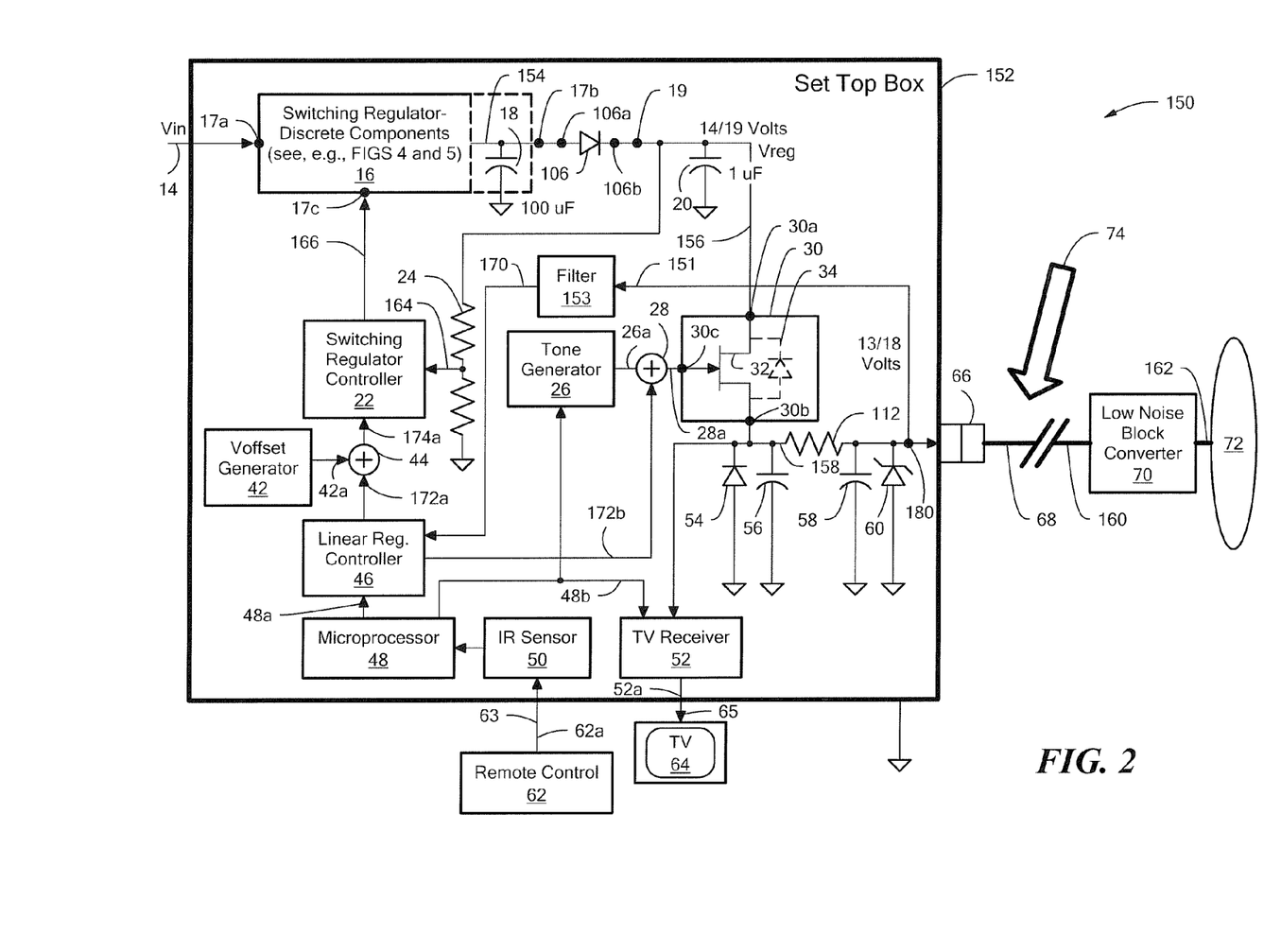

Referring now to FIG. 2, in which like elements of FIG. 1 are shown having like reference designations, a satellite TV system 150 includes a set top box 152 coupled to the LNB 70 though the signal cable 68, coupled to the television set (TV) 64 with the cable 65, and coupled to the remote control 62 with the infrared (IR) link 63.

The voltage divider 24 is coupled to receive a regulated output voltage 156 generated by the switching regulator 16, and is configured to generate a divided signal 164, which is received by the switching regulator controller 22 instead of the divided signal 24a of FIG. 1. A DC voltage within an out put signal 151 is regulated and stable.

The set top box 152 is similar to the set top box 12 of FIG. 1. However, the set top box 152 may not include the diode 40 of FIG. 1. Also, in some embodiments, the set top box 152 includes a diode 106 coupled as shown and as further described below. In some embodiments, the set top box 152 also includes a resistor 112 coupled in series with the cable 68.

The feedback signal to the adjustable linear regulator controller 46, which is shown in FIG. 1 as the signal 32a, can instead be provided as the output signal 151 passing through an optional filter 153, and provided as a signal 170 to the linear regulator controller 46. With this arrangement, any voltage drop through the resistor 112 is compensated in the closed feedback loop around the adjustable linear regulator 30. In turn, via a reference signal 172a generated by the linear regulator controller 46 and via the signal 42a generated by the offset voltage generator 42, the switching regulator 16 is controlled to maintain the regulated output voltage 156 above the DC voltage of the signal 151.

The filter 153 can be a low pass filter configured to remove the above-described 22 kHz tones from the feedback signal 170. However, in other embodiments, there is no filter and the linear regulator controller 46 is directly coupled to receive the signal 151, similar to the arrangement of FIG. 1. In still other embodiments, the filter 153 can instead be any electronic network.

The set top box 152 includes the switching regulator 16. The switching regulator 16 includes a switching regulator input node 17a at which the input voltage 14 is received. The switching regulator 16 also includes a voltage holding node 17b. The switching regulator 16 also includes the capacitor 18 coupled at one end to the voltage holding node 17b and coupled at the other end to a reference voltage, for example, ground. The switching regulator 16 also includes a switching regulator control node 17c. The set top box 152 also includes a reverse current blocking circuit 106 comprising first and second nodes 106a, 106b, respectively. The first node 106a is coupled to the voltage holding node 17b and the second node 106b is coupled to a regulated voltage output node 19. The reverse current blocking circuit 106 is configured to prevent a current from flowing from the regulated voltage output node 19 into the capacitor 18. The set top box 152 also includes the adjustable linear regulator 30. The reverse current blocking circuit 106 is coupled between the switching regulator 16 and the adjustable linear regulator 30. The set top box 152 also includes the switching regulator controller circuit 22 coupled between the regulated voltage output node 19 and the switching regulator control node 17c. The switching regulator 16 is configured to generate a regulated voltage 156 at the regulated voltage output node 19.

In operation, as described above, the reverse current blocking circuit, here shown as a diode 106, prevents a current from flowing from the regulated voltage output node 19 into the capacitor 18. With this arrangement, the parasitic diode 34, and therefore, the FET 32, are protected from any current that arises from the unwanted signal 74.

The switching regulator control node 17c is coupled to the regulated voltage output node 19 via the resistor divider 24. Thus, a DC voltage at the regulated voltage output node 19 is regulated and stable, and has a value determined by signals 164 and 174a.

It will be recognized that, since the voltage regulator 16 is controlled in a slightly different way than the voltage regulator 16 of FIG. 1, signals 156 and 151 can be slightly different than (but nominally the same as) the signals 16a and 32a of FIG. 1. The divided signal 164 can also be slightly different than the divided signal 24a of FIG. 1 and control signal 166 can be slightly different than the control signal 22a of FIG. 1.

In some embodiments, the set top box 102 can also include the resistor 112 coupled in series with the cable 68. However, since the feedback path of the signal 151 is coupled at an output node 180, the signal 151 carried by the cable 68 is nominally the same as the signal 32a of FIG. 1, which is carried by the cable 68.

Figure 2A:
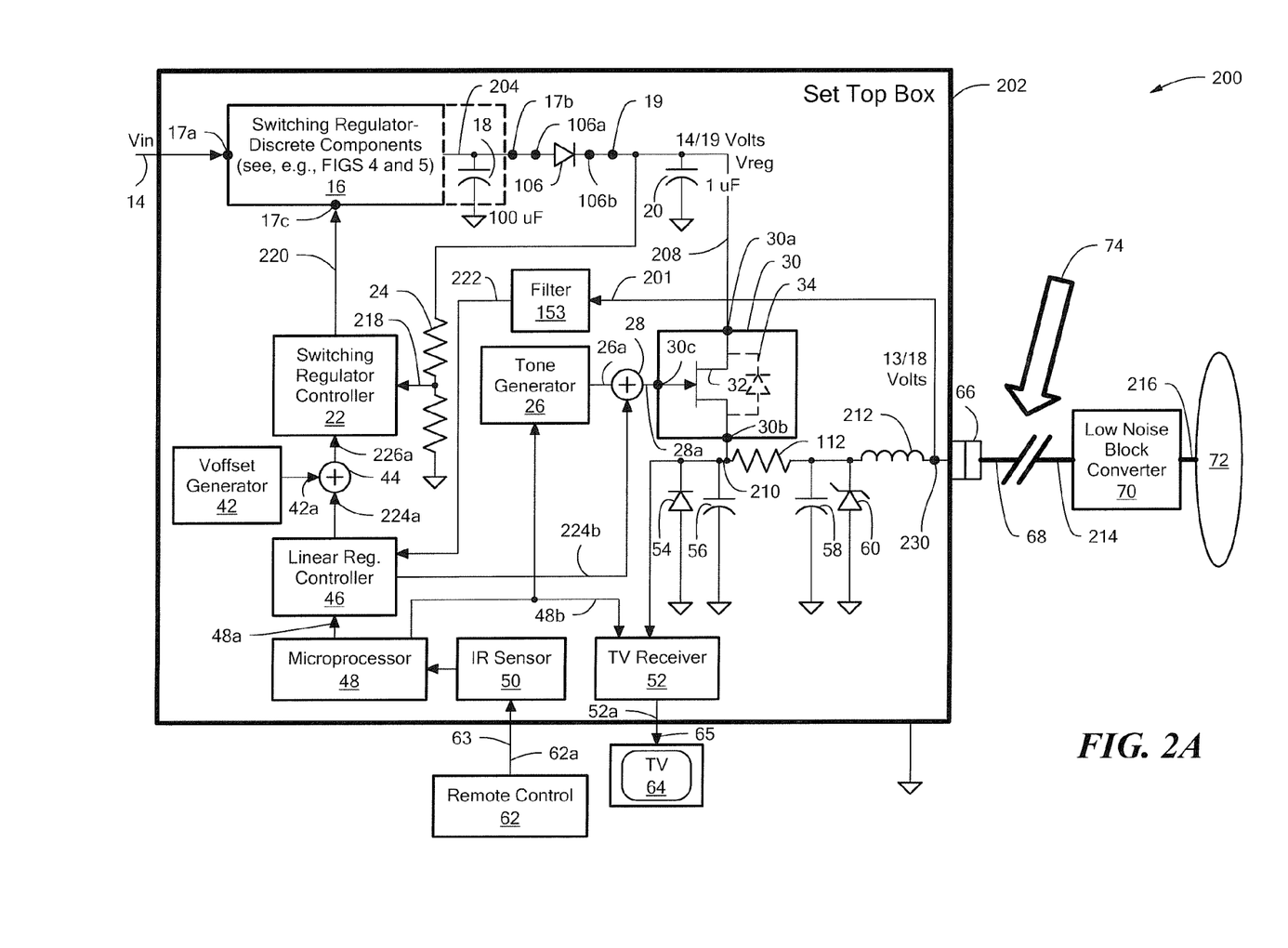
FIG. 2A is a block diagram showing another satellite television (TV) system including a set top box with another exemplary circuit arrangement configured to protect the set top box when it experiences a transient signal.

Referring now to FIG. 2A, in which like elements of FIGS. 1 and 2 are shown having like reference designations, a satellite TV system 200 includes a set top box 202, which is similar to the set top box 152 of FIG. 2. The voltage divider 24 is coupled to receive a regulated output voltage 208 generated by the switching regulator 16, and is configured to generate a divided signal 218, which is received by the switching regulator controller 22 instead of the divided signal 164 of FIG. 2. The filter circuit 153 is coupled to receive an output signal 201 carried by the cable 68. A DC voltage within the output signal 201 is regulated and stable.

It will be recognized that, since the voltage regulator 16 is controlled in a slightly different way that voltage regulator 16 of FIG. 2, signals 208 and 201 can be slightly different than (but nominally the same as) the signals 156 and 151 of FIG. 2, respectively. The divided signal 218 can also be slightly different than the divided signal 164 of FIG. 2 and the control signal 220 can be slightly different than the control signal 166 of FIG. 2.

In some embodiments, the set top box 202 can also include an inductor 212 coupled in series with the resistor 112, resulting in a signal 201 carried by the cable 68 that is nominally the same as the signal 151 of FIG. 2, which is carried by the cable 68.

The feedback signal to the adjustable linear regulator controller 46, which is shown in FIG. 1 as the signal 32a, can instead be provided as signal 201 passing through the optional filter 153, and provided as a signal 222 to the linear regulator controller 46. With this arrangement, any voltage drop through the resistor 112 and through the inductor 212 is compensated in the closed feedback loop around the adjustable linear regulator 30. In turn, via a reference signal 224a from the linear regulator controller 46 and via the signal 42a from offset voltage generator 42, the switching regulator 16 is also controlled to maintain a regulated output voltage 208 above the DC voltage of the signal output 201.

Using language similar to language recited above in conjunction with FIG. 2, the set top box 202 includes the switching regulator 16. The switching regulator 16 includes the switching regulator input node 17a at which the input voltage 14 is received. The switching regulator 16 also includes the voltage holding node 17b. The switching regulator 16 also includes the capacitor 18 coupled at one end to the voltage holding node 17b and coupled at the other end to a reference voltage, for example, ground. The switching regulator 16 also includes the switching regulator control node 17c. The set top box 202 also includes the reverse current blocking circuit 106 comprising first and second nodes 106a, 106b, respectively. The first node 106a is coupled to the voltage holding node 17b and the second node 106b is coupled to a regulated voltage output node 19. The reverse current blocking circuit 106 is configured to prevent a current from flowing from the regulated voltage output node 19 into the capacitor 18. The set top box 202 also includes the adjustable linear regulator 30. The reverse current blocking circuit 106 is coupled between the switching regulator 16 and the adjustable linear regulator 30.

The set top box 202 also includes the switching regulator controller circuit 22 coupled between the regulated voltage output node 19 and the switching regulator control node 17c. The switching regulator 16 is configured to generate a regulated voltage 208 at the regulated voltage output node 19.

The signal 201 includes both the regulated DC voltage and also a tone signal representative of the tone signal 26a.

Figure 3:
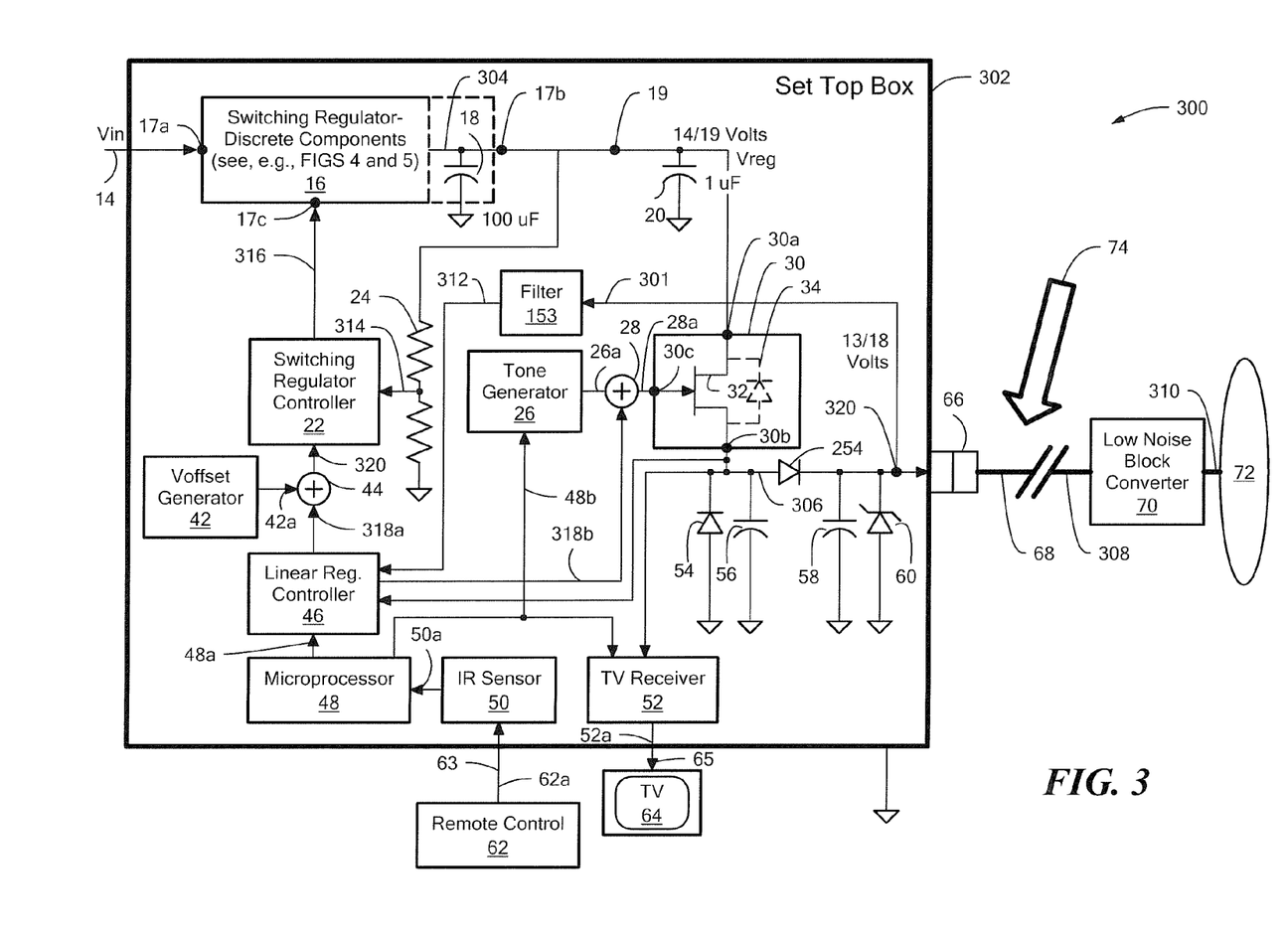
FIG. 3 is a block diagram showing another satellite television (TV) system including a set top box with another exemplary circuit arrangement configured to protect the set top box when it experiences a transient signal.

Referring now to FIG. 3, in which like elements of FIGS. 1, 2, and 2A are shown having like reference designations, a satellite TV system 300 includes a set top box 302, which does not include the diode 106 of FIGS. 2-2A, but which includes a diode 254 coupled in series with an output signal 301 carried by the cable 68.

Like the diode 106 of FIGS. 2 and 2A, the diode 254 blocks a current resulting from the unwanted signal 74 from passing through the diode 34.

In order to avoid a voltage drop resulting from the diode 254, the linear regulator controller 46 is coupled to receive a signal 312 from the filter circuit 153. The filter circuit 153 is coupled to receive the output signal 301.

With this arrangement, the DC voltage of the output signal 301 does not suffer the voltage drop of the diode 254.

Figure 3A:
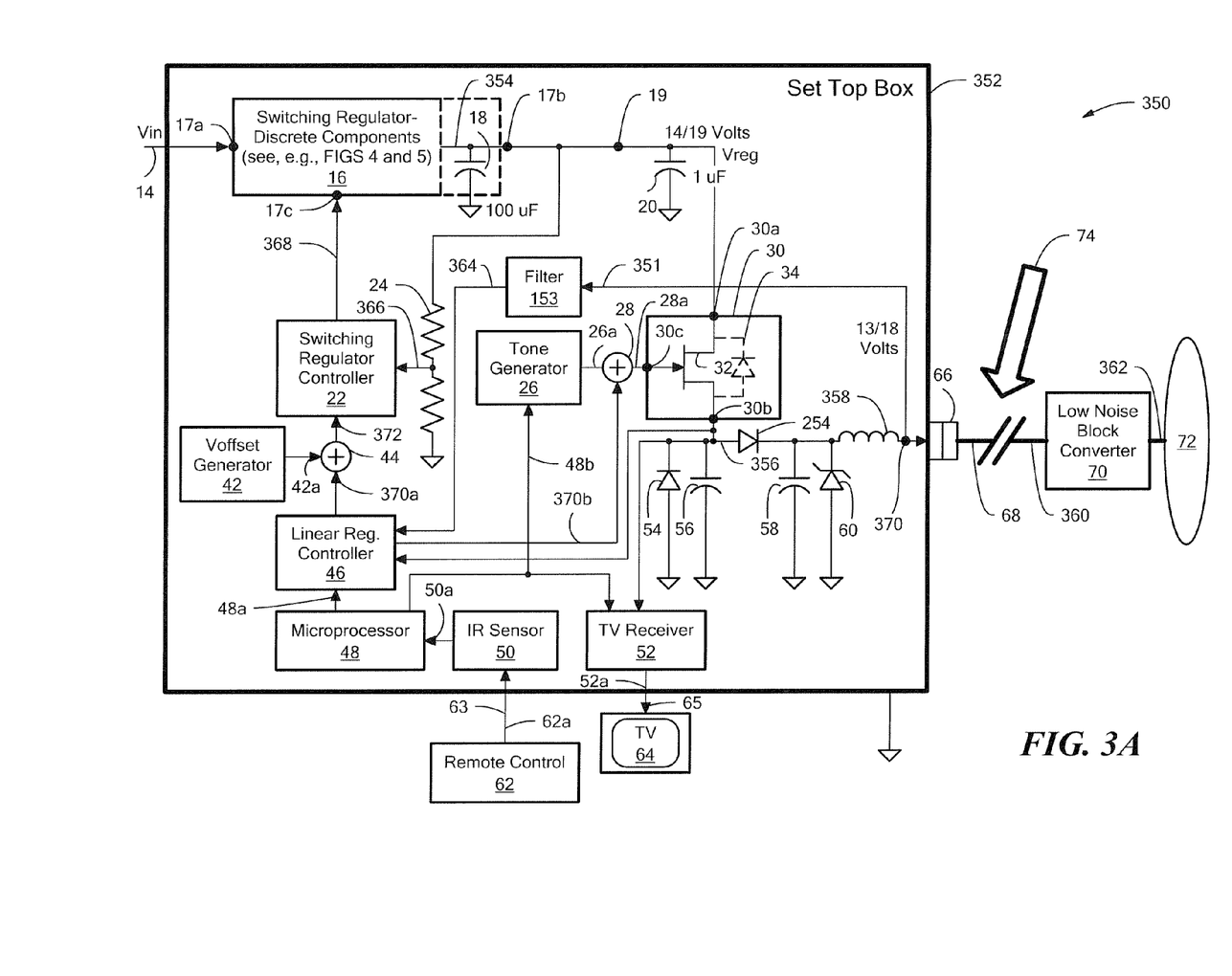
FIG. 3A is a block diagram showing another satellite television (TV) system including a set top box with another exemplary circuit arrangement configured to protect the set top box when it experiences a transient signal.

Referring now to FIG. 3A, in which like elements of FIGS. 1, 2, 2A, and 3 are shown having like reference designations, a satellite TV system 350 includes a set top box 352, which does not include the diode 106 of FIGS. 2 and 2A, but which includes the diode 254.

Unlike the set top box 302 of FIG. 3A, the set top box 352 includes an inductor coupled in series with the diode 254, resulting in an output signal 351 carried by the cable 68.

With this arrangement, like the arrangement of FIG. 3, the DC voltage of the output signal 351 does not suffer the voltage drop of the diode 254 or of the inductor 358.

While diodes 106 and 254 are shown in figures above to provide the reverse current blocking circuits necessary to protect the diode 34 and the FET 32, in other embodiments, the diodes 106 and 254 can be replaced with other circuit components that can also block currents like a diode. For example, the diodes 106 and 254 can be replaced with a silicon controlled rectifier (SCR) or with a bipolar transistor alone or in a transistor circuit.

Figure 4:
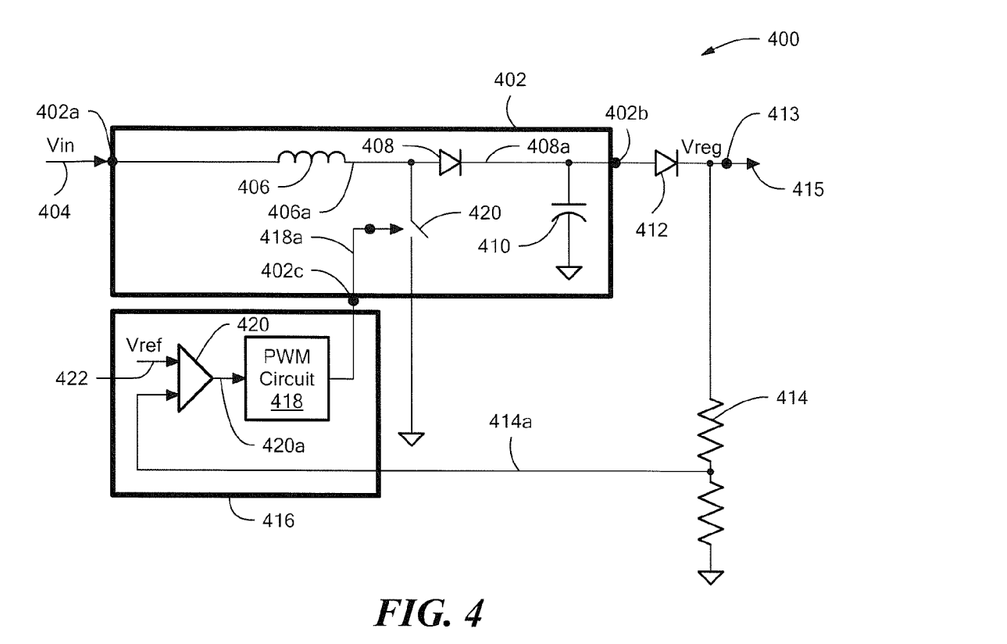
FIG. 4 is a block diagram showing a boost switching regulator as may be used in any of the set top boxes of FIGS. 2-3A.

Referring now to FIG. 4, a circuit 400 includes a boost switching regulator circuit 402, which can be the same as or similar to the switching regulator 16 of FIGS. 2-3A. It will be recognized that the boundaries of the boost switching regulator circuit 402 may include other portions of the circuit 400. However, for the sake of discussion, it is described herein that the boost switching regulator contains at least the circuit 402.

The boost switching regulator includes an inductor 406 having first and second nodes. The first node of the inductor 406 is coupled to receive a DC input signal 404 at an input node 402a of the boost switching regulator 402. The boost switching regulator 402 also includes a diode 408 having an anode and a cathode. The anode is coupled to the second node of the inductor 406. The boost switching regulator 402 also includes a capacitor 410 coupled between the cathode and ground. The boost switching regulator 402 also includes a switching circuit 420 having a switching node coupled to the second node of the inductor 406. In some embodiments, an input capacitor (not shown) can be coupled to the input node 402a of the boost switching regulator 402. The capacitor 410 can be the same as or similar to the capacitor 18 of FIGS. 2-3A.

In some embodiments, the circuit 400 includes a diode 412 having an anode and a cathode. The anode is coupled to a voltage holding node 402b of the boost switching regulator 402 and the cathode is coupled to a regulated voltage output node 413, at which a regulated DC output voltage 415 is generated. The diode 412 can be the same as or similar to the diode 106 of FIGS. 2-2A.

It will be understood that a regulated output voltage 415 is maintained by providing feedback to the boost switching regulator 402. To provide the feedback, a voltage divider 414 is coupled to receive the regulated voltage output signal 415 and configured to generate a divided signal 414a. A switching regulator controller 416 is coupled to receive the divided signal 414a and configured to provide a control signal 418a coupled to a control node 402c of the switching regulator 402, which is coupled to a control node of the switching circuit 420. The switching regulator controller 416 can be the same as or similar to the switching regulator controller 22 of FIGS. 2-3A and the voltage divider 414 can be the same as or similar to the voltage divider 24 of FIGS. 2-3A.

In some embodiments, the switching regulator controller 416 includes an amplifier, e.g., a comparator, coupled to receive the divided signal 414a and coupled to receive a reference voltage signal 422 (e.g., signal 174a of FIG. 2). The amplifier 420 is configured to compare the divided signal 414a to the reference signal 422 and to generate a comparison signal 420a. A pulse width modulation (PWM) circuit 418 is coupled to receive the comparison signal 420 and configured to generate the control signal 418a.

The circuit 400 is coupled in a circuit topology like a portion of the circuit 150 of FIG. 2. In particular, the circuit 400 includes the diode 412 coupled as shown and the resistor divider 414 coupled as shown. However, it will be understood that the boost switching regulator 402, the resistor divider 414, and the switching regulator controller 416 can be coupled into any of the arrangements of FIGS. 2-3A.

Figure 5:
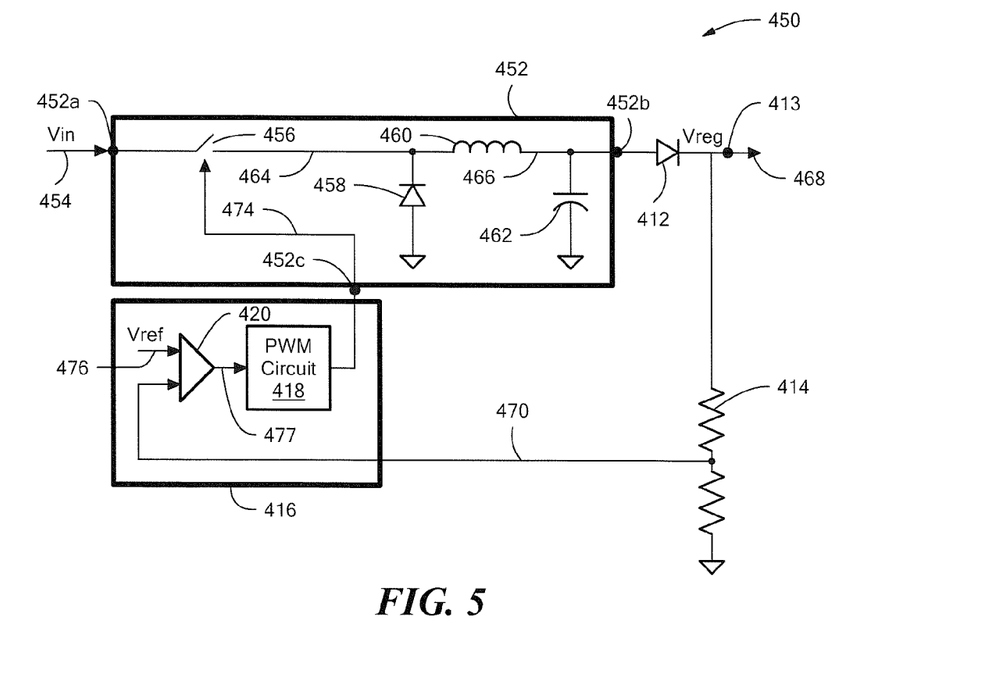
FIG. 5 is a block diagram showing a buck switching regulator as may be used in any of the set top boxes of FIGS. 2-3A.

Referring now to FIG. 5, in which like elements of FIG. 4 are shown having like reference designations, a circuit 450 includes a buck switching regulator circuit 452, which can be the same as or similar to the switching regulator 16 of FIGS. 2-3A. It will be recognized that the boundaries of the buck switching regulator circuit 452 can include other portions of the circuit 450. However, for the sake of discussion, it is described herein that the buck switching regulator contains at least the circuit 452.

The buck switching regulator includes a switching circuit 456 having a switching node coupled to receive a DC input signal 454 at an input node 452a of the buck switching regulator 452. The buck switching regulator 452 also includes a diode 458 having an anode and a cathode. The cathode is coupled to an output node of the switching circuit 456 and the anode can be coupled to ground. The buck switching regulator 452 also includes an inductor 460 having first and second nodes. The first node of the inductor 460 is coupled to the cathode of the diode 458. In some embodiments, an input capacitor (not shown) can be coupled to the input node 452a of the buck switching regulator 452. The buck switching regulator 452 also includes a capacitor 462 coupled to the second node of the inductor 460, which can be the same as or similar to the capacitor 18 of FIGS. 2-3A.

In some embodiments, the circuit 450 includes the diode 412 having an anode and a cathode. The anode is coupled to a voltage holding node 452b of the buck switching regulator 452 and the cathode is coupled to the regulated voltage output node 413, at which a regulated DC output voltage 468 is generated. The regulated voltage 468 can be the same as or similar to the regulated voltage 415 of FIG. 4. The diode 412 can be the same as or similar to the diode 106 of FIGS. 2-2A.

It will be understood that the regulated output voltage 468 is maintained by providing feedback to the buck switching regulator 452. To provide the feedback, the voltage divider 414 is coupled to receive the regulated voltage output signal 468 and configured to generate a divided signal 470. The switching regulator controller 416 is coupled to receive the divided signal 470 and configured to provide a control signal 474 coupled to a control node 452c of the switching regulator 452, which is coupled to a control node of the switching circuit 456. The switching regulator controller 416 can be the same as or similar to the switching regulator controller 22 of FIGS. 2-3A.

The circuit 450 is coupled in a circuit topology like a portion of the circuit 150 of FIG. 2. In particular, the circuit 450 includes the diode 412 coupled as shown and the resistor divider 414 coupled as shown. However, it will be understood that the buck switching regulator 452, the resistor divider 414, and the switching regulator controller 416 can be coupled into any of the arrangements of FIGS. 2-3A.

While boost and buck switching regulators are shown and described above, it should be understood that the switching regulator 16 of FIGS. 2-3A can be any one of the many forms of switching regulators, including, but not limited to, a boost switching regulator, a buck switching regulator, and a buck-boost switching regulator.

All references cited herein are hereby incorporated herein by reference in their entirety.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. An electronic circuit, comprising:
    a switching regulator comprising:
        a switching regulator input node at which an input voltage is received;
        a voltage holding node;
        a capacitor coupled at one end to the voltage holding node and coupled at the other end to a reference voltage; and
        a switching regulator control node, wherein the electronic circuit further comprises:
    a reverse current blocking circuit comprising first and second nodes, wherein the first node is coupled to the voltage holding node and the second node is coupled to a regulated voltage output node, wherein the reverse current blocking circuit is configured to prevent a current from flowing from the regulated voltage output node into the capacitor;
    an adjustable linear regulator; wherein the reverse current blocking circuit is coupled between the switching regulator and the adjustable linear regulator; and
    a switching regulator controller circuit coupled between the regulated voltage output node and the switching regulator control node, wherein the switching regulator is configured to generate a regulated voltage at the regulated voltage output node.

2. The electronic circuit of claim 1, wherein the reverse current blocking circuit comprises a reverse current blocking diode having an anode and a cathode, wherein the first node corresponds to the anode and the second node corresponds to the cathode.

3. The electronic circuit of claim 1, wherein the switching regulator comprises a boost regulator for which the input voltage is less than the regulated voltage.

4. The electronic circuit of claim 3, wherein the boost regulator comprises:
 an inductor coupled at one end to the switching regulator input node and coupled at the other end to a junction node;
 a switching diode comprising an anode and a cathode, wherein the anode is coupled to the junction node and the cathode is coupled to the voltage holding node; and
 a switch comprising an input node, an output node, and a switch control node, wherein the input node is coupled to the junction node, the output node is coupled to a reference voltage, and the switch control node is coupled to the switching regulator control node.

5. The electronic circuit of claim 4, wherein the switching regulator controller circuit comprises a pulse width modulation circuit coupled to receive an error signal related to the regulated voltage and configured to generate a pulse width modulated signal at the switching regulator control node responsive to the regulated voltage.

6. The electronic circuit of claim 1, wherein the switching regulator comprises a buck regulator for which the input voltage is greater than the regulated voltage.

7. The electronic circuit of claim 6, wherein the buck regulator comprises:
 a switch comprising an input node, an output node, and a switch control node, wherein the input node is coupled to the switching regulator input node and the switch control node is coupled to the switching regulator control node;
 an inductor coupled at one end to the output node of the switch and coupled at the other end to the voltage holding node; and
 a switching diode comprising an anode and a cathode, wherein the cathode is coupled to the output node of the switch and the anode is coupled to a reference voltage.

8. The electronic circuit of claim 7, wherein the switching regulator controller circuit comprises a pulse width modulation circuit coupled to receive an error signal related to the regulated voltage and configured to generate a pulse width modulated signal at the switching regulator control node responsive to the regulated voltage.

9. The electronic circuit of claim 1, wherein the adjustable linear regulator comprises at least one field effect transistor comprising a drain node, a source node, and a gate node, wherein a selected one of the drain node or the source node is coupled to the regulated voltage output node, and wherein the other one of the drain node or the source node is coupled to a circuit output node, wherein the electronic circuit is configured to generate a circuit output signal at the circuit output node related to the regulated voltage, wherein the electronic circuit is configured to transmit the output signal to a near end of a transmission cable.

10. The electronic circuit of claim 9, wherein the switching regulator comprises a boost regulator for which the input voltage is less than the regulated voltage.

11. The electronic circuit of claim 10, wherein the boost regulator comprises:
 an inductor coupled at one end to the switching regulator input node and coupled at the other end to a junction node;
 a switching diode comprising an anode and a cathode, wherein the anode is coupled to the junction node and the cathode is coupled to the voltage holding node; and
 a switch comprising an input node, an output node, and a switch control node, wherein the input node is coupled to the junction node, the output node is coupled to a reference voltage, and the switch control node is coupled to the switching regulator control node.

12. The electronic circuit of claim 11, wherein the switching regulator controller circuit comprises a pulse width modulation circuit coupled to receive an error signal related to the regulated voltage and configured to generate a pulse width modulated signal at the switching regulator control node responsive to the regulated voltage.

13. The electronic circuit of claim 9, wherein the switching regulator comprises a buck regulator for which the input voltage is greater than the regulated voltage.

14. The electronic circuit of claim 13, wherein the buck regulator comprises:
 a switch comprising an input node, an output node, and a switch control node, wherein the input node is coupled to the switching regulator input node and the switch control node is coupled to the switching regulator control node;
 an inductor coupled at one end to the output node of the switch and coupled at the other end to the voltage holding node; and
 a switching diode comprising an anode and a cathode, wherein the cathode is coupled to the output node of the switch and the anode is coupled to a reference voltage.

15. The electronic circuit of claim 14, wherein the switching regulator controller circuit comprises a pulse width modulation circuit coupled to receive an error signal related to the regulated voltage and configured to generate a pulse width modulated signal at the switching regulator control node responsive to the regulated voltage.

16. The electronic circuit of claim 9, wherein a far end of the transmission cable is configured to communicate the circuit output signal to a low noise block converter or a satellite television receiving system.

17. The electronic circuit of claim 9, further comprising a resistor coupled between the field effect transistor and the circuit output node.

18. The electronic circuit of claim 9, further comprising a voltage suppressing circuit element coupled between the circuit output node and a reference voltage.

19. The electronic circuit of claim 9, further comprising a clamping diode comprising an anode and a cathode, wherein the anode is coupled to a reference voltage and the cathode is coupled to the circuit output node.

20. The electronic circuit of claim 9, wherein the electronic circuit is configured to generate at the circuit output node an output signal having a DC voltage selected from among a plurality of predetermined DC voltages.

21. An electronic circuit, comprising:
 a switching regulator comprising:
  a switching regulator input node at which an input voltage is received;
  a voltage holding node;
  a capacitor coupled at one end to the voltage holding node and coupled at the other end to a reference voltage; and
  a switching regulator control node; wherein the electronic circuit further comprises:
 a reverse current blocking circuit comprising first and second nodes, wherein the first node is coupled to the voltage holding node and the second node is coupled to a regulated voltage output node, wherein the reverse current blocking circuit is configured to prevent a current from flowing from the regulated voltage output node into the capacitor;

an adjustable linear regulator; wherein the reverse current blocking circuit is coupled between the switching regulator and the adjustable linear regulator;

a switching regulator controller circuit coupled between the regulated voltage output node and the switching regulator control node, wherein the switching regulator is configured to generate a regulated voltage at the regulated voltage output node; and a resistor and/or an inductor coupled between the adjustable linear regulator and a circuit output node, wherein a circuit output signal is generated at the circuit output node related to the regulated voltage.

22. The electronic circuit of claim 21, wherein the reverse current blocking circuit comprises a reverse current blocking diode having an anode and a cathode, wherein the first node corresponds to the anode and the second node corresponds to the cathode.

* * * * *

UNITED STATES PATENT AND TRADEMARK OFFICE
CERTIFICATE OF CORRECTION

PATENT NO. : 8,476,875 B2  
APPLICATION NO. : 12/902667  
DATED : July 2, 2013  
INVENTOR(S) : Eric J. Reicher Page 1 of 1

It is certified that error appears in the above-identified patent and that said Letters Patent is hereby corrected as shown below:

In the Specification

Column 1, Line 43, delete "DiSEgC™" and replace with --DiSEqC™--.

Column 1, Line 57, delete "U.S. Pat. No." and replace with --U.S. Patent No.--.

Column 1, Line 58, delete "Apr." and replace with --April--.

Column 2, Line 4, delete "U.S. Pat. No." and replace with --U.S. Patent No.--.

Column 2, Line 37, delete "(TVS)" and replace with --(TVS).--.

Column 3, Line 42, delete "DiSEgC™" and replace with --DiSEqC™--.

Column 6, Line 3/4, delete "out put" and replace with --output--.

Signed and Sealed this  
Thirtieth Day of June, 2015

Michelle K. Lee  
*Director of the United States Patent and Trademark Office*